United States Patent Office 2,898,311
Patented Aug. 4, 1959

2,898,311

SULFONIC ACID TYPE CATION EXCHANGE RESIN

Yoshio Tsunoda, Shibuya-ku, Tokyo, Maomi Seko, Okatomi, Nobeoka-shi, and Masaaki Watanabe, Ryo Ehara, and Teruyuki Misumi, Tsunetomi, Nobeoka-shi, Japan, assignors to Asahi Kasei Kogyo Kabushiki Kaisha, Osaka, Japan No Drawing. Application April 16, 1956
Serial No. 578,203

Claims priority, application Japan June 8, 1955

10 Claims. (Cl. 260—2.2)

This invention relates to sulfonic acid type cation exchange resin having large dimensions and which is not fractured throughout the preparation. This invention relates particularly to sulfonic acid type resin prepared from the base polymer matrix comprising monovinyl compounds which contain sulfonic acid group and/or sulfonic acid derivative group and polyolefinic compound, said sulfonic acid derivative group being bonded to said matrix by hydrolysis after preparation of the base polymer matrix. This invention relates more particularly to composition of and preparation of the base polymer matrix of sulfonic acid type cation exchange resin which contain sulfonic acid group or the derivative groups that can be converted into sulfonic acid group by hydrolysis. The base polymer matrix prepared essentially from monovinyl compounds containing sulfonic acid group are available as cation exchange resins in themselves; while when the derivatives are employed hydrolysis is required after polymerization so as to convert the derivative group fixed to the matrix into free sulfonic acid group. Moreover this invention relates especially to sulfonic acid type cation exchange resin having large dimensions i.e. plate, rod or pipe-like resin.

Many sulfonic acid type cation exchange resins were theretofore known, but they were of small particles usually less than 0.1 cm. in diameter.

Ion exchange resin of dimensions larger than 0.8 cm. was mentioned in U.S. Patent No. 2,636,851 of W. Juda and W. A. MacRae. But in Juda's patent there was no description about the homogeneous sulfonic acid type cation exchange resin having large dimension. In general, usual sulfonic acid type cation exchange resins are prepared by the following process.

(1) A method introducing sulfonic acid group to base polymer matrix prepared from monovinyl aromatic compounds and polyolefinic compounds by sulfonation of said base polymer matrix.

(2) A method consisting of following two steps, at first monovinyl compound having sulfonic acid or its derivative group, such as sulfonic acid ester group etc. which can be converted to sulfonic acid group by hydrolysis, and polyolefinic compound are polymerized to form a base polymer matrix, and then said base polymer matrix is hydrolysed and changed into base polymer matrix having sulfonic acid group, when a monomer having sulfonic acid ester group is used (U.S. Patent No. 2,527,300, Journal of Physical Chemistry, 59 (1955), 86). Among these methods, (1) concerns the process in which the monomer not having sulfonic acid and/or its derivative is used, therefore it is out of the scope of this invention. Therefore, in the following description we compare the method of this invention with publicly known methods which belong to the methods (2).

In general, the following known processes were employed for the manufacture of ion exchange resins having dimensions respectively larger than 1 cm., in at least two directions. However, they always have disadvantages causing cracks and fractures in the resultant resin.

(1) Process of copolymerization of a monovinyl compound having sulfonic acid group or its derivative group which can be converted into sulfonic acid group by hydrolysis and polyolefinic compound to form base polymer matrix.

(2) Process of hydrolysis by which said base polymer matrix was converted into sulfonic acid type resin, when monovinyl compound having sulfonic acid derivative group was used as said monovinyl compound monomer.

(3) Process of removing and washing off chemical reagents of hydrolysis.

These circumstances can more fully be understood, particularly in case of the manufacture of sulfonic acid type cation exchange membrane from monovinyl compound having sulfonic acid ester group by the known methods.

As the usual granular resin was insoluble in solvents and infusible by heat, homogeneous sulfonic acid type cation exchange resin membrane could not be made from usual granular resin by using solvent or heat-treatment. Therefore, in order to make a sulfonic acid type cation exchange resin membrane, it was necessary to make a membrane type base polymer matrix from monovinyl compound having sulfonic acid ester group and divinylbenzene. The base polymer matrix in a form of sheet must be polymerized by means of solution or mass polymerization. However, if the conditions similar to those of preparing ordinary granular resins were applied to the polymerization, cracks were formed in the mass of solution polymerization as far as the monomers themselves were used, and, therefore, base polymer matrix having a large area could not be obtained. Even if the monomers were polymerized at a lower temperature and in a longer time than usual, there could hardly be obtained base polymer matrix in sheet form having no cracks, and the sheet formed matrix could not be hydrolysed or washed without cracks. In general, in the process of hydrolysis etc., the base polymer matrix was used to swell and this swelling always damaged or destroyed the structure of said base polymer matrix. Therefore, in almost all cases, said sheet formed base polymer matrix would naturally become into small pieces, and sulfonic acid type cation exchange membrane could never be obtained. Such fracture was also apt to occur more easily after hydrolysis. Immediately after hydrolysis, plate-shaped resin was drained off the hydrolysing solution and was immersed into water to remove excess hydrolysing solution therefrom, and then said plate-shaped resin would be easily destroyed. In order to obtain plate-shaped cation exchange resin, it must be necessary to wash said resin very carefully in several steps with a solution of gradually lowering concentration. These situations illustrate the reason why the homogeneous cation exchange membranes have never been prepared from styrene-divinylbenzene copolymer.

We have now found a new base polymer matrix suitable for manufacturing sulfonic acid type cation exchange resin having at least two dimensions each in excess of 1 cm., and granular sulfonic acid type cation exchange resin, which are not damaged, cracked or fractured throughout the process of polymerization, hydrolysis washing etc., however large the dimensions of the resin are.

The method of this invention is exemplified as follows: At first monovinyl compound having sulfonic acid ester group and/or not is partially polymerized, and next this polymer-containing solution is added with (a) the monomer having sulfonic acid group and/or sulfonic acid derivative group which can be converted to sulfonic acid group by hydrolysis and with (b) cross linking agent such as polyolefinic compound. This mixed solution is subjected to polymerization completely, and the matrix bonding with sulfonic acid group is obtained. At that time, when monomer having sulfonic acid derivative group is used, hydrolysis is required after the polymerization. Thus, a sulfonic acid type crackless cation exchange resin having at least two dimensions each larger than 1 cm., and crack-proof granular sulfonic acid type cation exchange resin without cracking are obtained. Such base polymer matrix is quite different from the ordinary base polymer matrix obtained by usual method: For example, the base polymer matrix of this invention never be fractured in any process of polymerization, hydrolysis or washing etc., mechanical properties such as flexibility are superior to those of known polymer matrix. Whereas the usual known base polymer matrix prepared from monovinyl compound having $SO_2$—R radical and divinylbenzene by sole copolymerization is transparent, the polymer of this invention is white, turbid and opaque. Moreover, when cation exchange resin by usual method is immersed in distilled water immediately after hydrolysis, the resin is always fractured into small pieces. Therefore, in order to prevent the fracture of the known resin, the sulfonic acid type resin had to be first immersed into concentrated salt solution and then the concentration of said salt solution had to be gradually reduced. For the same reasons, the larger the dimensions of the sulfonic acid type cation exchange resin produced by the known method, the more are the accumulation of strains caused by swelling and shrinkage and the more easily the resin will be fractured. On the contrary, even when the resin made by the method of this invention is immersed into distilled water just after the hydrolysis, it never be fractured or cracked. Such important differences in physical and chemical properties exist between the base polymer matrix made by the ordinary method and the base polymer matrix made by the method of this invention. These situations are applicable for other shapes i.e. pipe, tube etc., of sulfonic acid cation exchange resin having large dimension other than membrane.

Concrete method of this invention is shown in the following. At least one monomer selected from the group of monovinyl compounds having $SO_2$—R group and/or not having $SO_2$—R group, where R represents hydroxyl group, alkoxy group, aryloxy group, halogen and oxygen, and $SO_2R$ is hydrolyzed to hydroxyl group if necessary, is partially polymerized. In the polymerization, catalyst and other inert material may be added. This polymer containing solution is added with monovinyl monomer having $SO_2$—R group and/or not having $SO_2$—R group. Moreover this solution is added with polyolefinic compound and inactive substance which is not polymerizable is added or not, then whole mixture is polymerized to base polymer matrix. This whole mixture must comprise the polymer, which is prepared from the monovinyl monomer having $SO_2$—R group and/or not having $SO_2$—R group with (a) monomer having $SO_2$—R radical and with (b) polyolefinic compound monomer. When monovinyl compound having $SO_2$—R radical, which R can be hydrolyzed, is used as a monomer for producing base polymer matrix, the base polymer matrix must be hydrolysed in hydrolysing agent in order to convert said sulfonic acid derivative group into sulfonic acid group. When the monomer having $SO_2$—OH is used, the base polymer matrix is used as cation exchange resin directly. Instead of partial polymerization in above mentioned process, monomer solution in which the polymer is dissolved is also available, and added with polyolefinic compound and finally mixed solution is polymerized to insoluble infusible base polymer matrix, where said monomer is at least one monomer selected from the group of monovinyl compound having $SO_2$—R group and/or not having $SO_2$—R radical and said polymer is made of monomer having $SO_2$—R radical and/or not having $SO_2$—R group, and in any case the monomer having $SO_2$—R radical and polyolefinic compound are essential component of said matrix. As above mentioned in detail, there exist two sorts of monovinyl monomer component, i.e. monovinyl compound having $SO_2$—R radical and monovinyl compound not having $SO_2$—R radical. The polymer which is dissolved in either or both components of monomer is prepared from either or both components. Therefore the selection of monomer component and polymer composition concerning as monovinyl compound is carried as follows:

| Composition | Monomer |
| --- | --- |
| 1. monovinyl compound having $SO_2$—R radical. | monovinyl compound having $SO_2$—R radical and/or compound having $SO_2$—R radical. |
| 2. monovinyl compound having $SO_2$—R radical+monovinyl compound not having $SO_2$—R radical. | monovinyl compound having $SO_2$—R radical and/or compound not having $SO_2$—R radical. |
| 3. monovinyl compound not having $SO_2$—R radical. | monovinyl compound having $SO_2$—R radical and/or compound not having $SO_2$—R radical. |

In each case of 1, 2, and 3, the existence of partially polymerized polymerizate makes the final base polymer matrix free from cracking, shattering and fracturing in any step of polymerization, hydrolysis, ion exchange process, washing, etc. The facts that the linearly polymerized part exists in said matrix is same situation between three cases 1, 2, and 3, but the final resin of case 1, 2 and 3 shows a little different electrochemical behavior. This is due to the nature of linearly polymerized part of final resin. In case 1, partial polymerized part can never be copolymerized with polyolefinic monomer, during the step of final polymerization, this part can not be fixed to final base polymer matrix by chemical bond, and have a tendency towards solubilizing, therefore the final cation exchange resin has a tendency towards swelling. The reduced electrochemical characteristic for instance, the reduction of selectivity is ascribed to this soluble polymerized part, but on the other hand they have high electric conductivity. In case 3, the linearly polymerized part is quite hydrophobic and insoluble in water, the swelling of final resin is more reduced than case 1, and the electrochemical performance i.e. selectivity is quite improved. In case 2, linearly polymerized part in final resin has average nature of cases 1 and 3, therefore the characteristics of final resin range between two other resins. In the step of polymerization catalyst and other inert material may or may not be added. Catalyst accelerates the polymerization as in usual radical polymerization. If a plasticizer is added in the course of polymerization as an inert material, the rate of polymerization is smoothly controlled, and moreover the final base polymer matrix is easily cut in any desired shape. In our process for preparing the various shape of ion exchange resin, plasticizer does not necessitate to contain in the final cation exchange resin as a softener, they are only used in step of process to prepare the base polymer, especially the purpose of working of the base polymer matrix into various shapes, i.e. sheet, pipe, rod, etc. Besides, the addition of plasticizer has other advantages in this invention. In the step of dissolving polymer into monomer, the presence of plasticizer helps the dissolution of polymer to dissolve easily and also in the step of polymerization, its presence controls smoothly the rate of polymerization. Therefore the plasticizer does not necessarily have general characteristics of purpose, for instance, characteristics in softness in low temperature, low vapor pressure, etc. In these reasons swelling agent of base polymer matrix may be used as a plasticizer. These plasticizers may be extracted after polymerization by their solvent after the working. The reinforcing material may be used as an inert material.

Monovinyl compound not having $SO_2$—R group is seelcted from aromatic compounds such as benzene and naphthalene groups and monovinyl aliphatic compounds. Said monovinyl aromatic compound has 10 or less carbon atoms in the aromatic nucleus and may or not have 1 or 3 halogens and/or alkyl radicals below tertiary alkyl groups in the aromatic nucleus besides vinyl radicals. Methyl groups are often used for alkyl substituents. Examples of such monovinyl compounds are styrene, α-methylstyrene, ar-methylstyrene, ar-dimethylstyrene, ar-ethylvinylbenzene, ar-chlorstyrene, vinylnaphthalene, ar-methylvinylnaphthalene, ar-secondary-butylstyrene and ar-trimethylstyrene. Said monovinyl aliphatic compounds are such as vinyl chloride, vinylidene chloride, methylvinylketone, methylvinylether and vinyl acetate.

Monovinyl compound having $SO_2$—R radical which can be converted into sulfonic acid group are represented by following general formula:

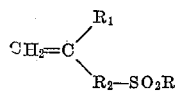

where R represents hydroxyl group, alkoxy group, aryloxy group, halogen atom, oxygen atom, $R_1$ represents hydrogen atom, alkyl group, aryl group, aralkyl group or halogen atom and $R_2$ represents alken group generally formulated $-(CH_2)-_n$, where $n=0$ or $n=1-4$, their halogen derivative group, arylene group, their halogen derivative group, aralkylene group or their halogene derivative group, and they are for example, ethylenesulfonic acid, α-methylethylenesulfonic acid, α-phenyl-ethylenesulfonic acid, α-(p-toluyl)-ethylenesulfonic acid, α-benzylethylenesulfonic acid, α-chlorethylenesulfonic acid, propylene (2,3) sulfonic acid, 1-chlor-propylene-(2,3)-sulfonic acid, p-styrensulfonic acid, 3-chlor-4-vinylbenzene sulfonic acid, p-propenyl (2,3)-benzenesulfonic acid, p-(1-chloro-) propenyl (2,3)-benzene sulfonic acid, etc. Monovinyl compounds having sulfonic acid derivative group which can be converted into sulfonic acid group by hydrolysis are chloride, ester, amide or anhydride of above exemplified monovinyl compound having sulfonic acid group, and they are for example, ethylenesulfonyl chloride, n-butyl α-methyl-ethylenesulfonate, p-styrensulfondimethylamide, p-(1-chloro-)propenyl(2,3)-benzenesulfonic acid anhydride, etc.

The polyolefinic compounds are selected from the compounds in which polymerizable double bonds exist at least two in one molecule. Examples of the polyolefinic compounds are divinylbenzene, ar-divinyltoluene, ar-divinylxylene, ar-divinylchlorobenzene, divinylnaphthalene, ar-divinylethylbenzene and divinylether, butadien, isoprene, bimethallyl, biallyl, trivinylbenzene, such unsaturated compounds as dimethallylether, dimethallyl sulphite and vinylallylether and such unsaturated compounds as diallyl maleate, chloroallyl crotonate and ethylene dimethacrylate.

The plasticizer to be added as a substance which is independent with polymerization is selected from the following compounds, aliphatic mono-carboxylic acid ester such as amyl laurate, aliphatic di-carboxylic acid di-ester such as di-butyl sebacate or di-2-ethyl-hexyl adipate, aromatic di-carboxylic acid di-ester such as di-methyl phthalate, ester of phosphoric acid such as tri-cresylphosphate, chlorinated paraffine, or biphenyl derivatives such as chlorinated bi-phenyl or 2-nitro biphenyl low molecular weight polymerizate of said monomer when said low molecular weight polymerizate of said monovinyl monomer does not inhibit the polymerization of said monomer. In the preparation of base polymer matrix, each component constitutes in weight percent to the total solution mixture as follows: (I) the monovinyl compound having $SO_2$—R radical 15-80%, (II) monovinyl compound not having $SO_2$—R radical 0-40%, (III) polymer of (I) and/or (II) 0.5-20% (either as polymer or as the result of partial polymerization), (IV) polyolefinic compound 3-10% and (V) plasticizer 15-40%.

The polymerization is carried out at a temperature 25 to 150° C., preferably in an atmosphere free from oxygen, in the presence of catalyst such as benzoyl peroxide, potassium persulfate, sodium perborate and ammonium persulfate or not.

In a case when monovinyl compound having sulfonic acid group is used as said monovinyl monomer, the resulted base polymer matrix has already ion exchange groups in itself, on the contrary, in a case when monovinyl compound having sulfonic acid derivative group which can be converted into sulfonic acid group by hydrolysis, the resulted base polymer matrix has to be hydrolysed in order to convert said sulfonic acid derivative group into sulfonic acid group. After the polymerization plasticizer may be extracted with solvents.

As a hydrolyzing agent, strong mineral acid such as concentrated hydrochloric acid, concentrated hydroiodic acid, hydrofluoric acid, nitric acid, sulfuric acid and hydrogen peroxide is applicable. Hydrolysis is carried out at a relatively high temperature under ordinary pressure, and in case of hydrohalogenic acid, preferably in a condition that said acid boiled azeotropically with water under relatively high pressure, also an aqueous solution of acetic acid involving sulfuric acid or toluene sulfonic acid is applicable. An aqueous solution or an alcoholic solution of caustic soda, caustic potash or ammoniac is used as a basic hydrolyzing agent. It is preferable to use 5 to 8% alcoholic solution of caustic potash or 2-15% aqueous solution of caustic soda or caustic potash. In this case the hydrolysis is carried out at a temperature of 30 to 200° C., and more easily by swelling said base polymer in an adequate solvent. This solvent must not be selected by hydrolysing agent, such as acetone, ethylene dichloride, benzene, dioxane or chlorobenzene. Thus almost 100% of sulfonic acid derivative groups are converted into sulfonic groups. However, instead of converting whole sulfonic acid derivative groups into sulfonic acid groups, it is possible to hydrolyse partially the base polymer matrix in order to obtain the cation exchange resin of various electric properties.

As mentioned above, in the preparation of a sulfonic acid type cation exchange resin having at least two dimensions each in excess of 1 cm. which are not cracked and granular sulfonic acid type cation exchange resins which are not fractured, monomer solution which comprises at least one monovinyl monomer not having $SO_2$—R group and/or having $SO_2$—R radical and with (a) polymer thereof (b) monovinyl monomer having $SO_2$—R radical and with (c) polyolefinic compound with or without inert material such as plasticizer is subjected to the bulk or solution polymerization to form three-dimensionally crosslinked insoluble infusible base polymer matrix, and said cation exchange groups are bonded to said matrix already in case said monomer having $SO_2$—OH group is used, and said cation exchange groups are bonded to said matrix after the hydrolysis of $SO_2$—R groups in case monomer having $SO_2$—R group is used. The sulfonic acid type cation exchange resin produced by the method of our invention is very stable against volume change due to swelling and shrinking. Thus the ion exchange resin having at least two dimensions each in excess of 1 cm., and granular sulfonic acid type cation exchange resin which is not fractured can be obtained. This resin is not cracked or fractured by swelling and shrinking throughout the whole process of production.

The following are examples of practice of this invention, but do not necessarily limit the scope of this invention.

Examples 1 to 3 are a method of producing base polymer matrix having sulfonic acid ester group.

*Example 1*

1000 parts of freshly distilled butyl ethylenesulfonate were partially polymerized in a nitrogen atmosphere at 65° C. for 14 hours. This partial polymerizate solution had a viscosity of about 1000 poises and contained about 24% polymer from analysis. 80 parts of divinylbenzene, 120 parts of ethylvinylbenzene, 350 parts of diethylphthalate as a plasticizer and 1 part of benzoylperoxide as a catalyst were added to said solution and mixed uniformly. This whole mixture was deaerated and was polymerized for 15 hours at 70° C., then for 6 hours at 90° C. The polymerizate thus obtained could be worked into the shape such as plate or rod. On the contrary, when the same monomers were subjected to solution polymerization in conventional way, cracks were caused during polymerization and polymer of large dimensions could not be obtained.

*Example 2*

56 parts of polymerizate of butyl ethylenesulfonate was dissolved in 344 parts of freshly distilled butyl ethylenesulfonate. This solution was used instead of partial polymerizate containing polymer of butyl ethylenesulfonate used in Example 1. The polymerizate obtained by this method had physical properties same as those shown in Example 1.

*Example 3*

This example shows the method of hydrolysing the base polymer matrix obtained by the methods of above mentioned Examples 1 and 2. Sheet form polymerizate, 0.7 mm. in thickness, having an area of 10 cm. x 10 cm. was prepared by the methods of above mentioned examples. 10 sheets of these base polymer were placed into a reaction vessel with reflux condenser. A solution of 80 parts of caustic soda in 1000 parts of ethanol was poured into said reaction vessel, then this solution and said base polymer were heated at reflux temperature for 72 hours. After hydrolysis, said sheets were immersed in water, washed with water and stored. The transport numbers of sodium ion in these cation exchange resin membranes were observed in 1.5 N aqueous sodium chloride solution at 25° C., and specific conductivities were observed in 0.5 sodium chloride aqueous solution at 25° C. The results are tabulated in the following.

| Example wherein the base polymer matrix is prepared | Transport number of sodium ion in 1.5 N sodium chloride aqueous solution at 25° C. (percent) | Specific conductivity in 0.5 N sodium chloride aqueous solution at 25° C. $(\Omega^{-1}\text{cm.}^{-1}) \times 10^3$ |
| --- | --- | --- |
| Example 1 | 79 | 25 |

As above mentioned, the base polymer matrix produced by Examples 1 and 2 was quite free from any cracks or fractures during this process of hydrolysis. The thin sheet prepared by application of publicly known conventional method of polymerizing butyl ethylenesulfonate, styrene, divinylbenzene and ethylvinylbenzene into sheet form in said hexahedral vessel having two facing walls of large area with a small clearance in-between was seriously influenced upon the properties of polymer with wall contacting therewith during polymerization and its polymerization proceeded heterogeneously and in almost every case the obtained polymer sheet had cracked or fractured and locally heterogeneous white spot was observed on its surface. Therefore, when this polymer sheet was hydrolysed according to this Example 3, said sheet produced by polymerization of monomers was cracked and fractured because of the composition of said copolymer sheet itself and heterogeneousity based on polymerization proceeding locally. On the contrary, when the method of this invention was applied, neither cracking nor fracturing of said sheet had occurred, and the resulted polymer sheet was never cracked or fractured during the process of hydrolysis based upon its composition which was essentially different from publicly known polymerizate and upon its polymerization proceeding very uniformly, and thus ion exchange resin of desired size could be produced.

*Example 4*

Butyl α-methylsulfonate can be used in same way as butyl ethylenesulfonate in Examples 1–3, and resulted polymerizate had similar properties as those of Examples 1–3. One of these cases will be exemplified as follows: 400 parts of freshly distilled butyl α-methylethylenesulfonate was polymerized partially in a nitrogen atmosphere at 70° C. for 14 hours. This partial polymerizate solution had a viscosity of about 800 poises, and contained about 25% of polymer from analysis. 44 parts of divinylbenzene, 55 parts of ethylvinylbenzene, 120 parts of dimethylphthalate and 0.08 part of benzoyl peroxide were added to this partial polymerizate solution and mixed uniformly. This whole mixture was deaerated, and polymerized in a nitrogen atmosphere for 48 hours at 50° C., for 24 hours at 70° C. and then for 24 hours at 90° C., and thus polymerization was finished. As mentioned in above examples, sheet form polymerizate, 0.7 mm. in thickness, 50 cm. x 50 cm. in area was obtained. Those sheets were white, turbid and elastic and had no cracks. These 10 sheets were placed into reaction vessel with reflux condenser. An aqueous solution made of 700 parts of water and 300 parts of caustic soda was poured into said reaction vessel, and heated at reflux temperature of said solution for 48 hours. After hydrolysis the sheets were washed in water, stored. This cation exchange membrane had a transport number of 90% in 1.5 N sodium chloride solution at 25° C. and a specific conductivity value of 27 x 10⁻³ mho cm.⁻¹ in 0.5 N sodium chloride solution at 25° C.

*Example 5*

1000 parts of freshly distilled ethyl ar-styrene-sulfonate were polymerized partially in a nitrogene atmosphere at 80° C. for 20 hours. This partial polymerizate solution had a viscosity of about 800 poises and from analysis, contained about 25% of polymer. 80 parts of divinylbenzene, 120 parts of ethylvinylbenzene, 350 parts of dimethylphthalate and 1 part of benzoyl peroxide were added and mixed uniformly. This whole mixture was deaerated, and polymerized in a nitrogen atmosphere for 24 hours at 60° C., for 24 hours at 80° C. and for 10 hours at 100° C. Thus obtained polymerizate was white opaque and crackless, and able to be worked into sheet. These base polymer were hydrolysed into sulfonic acid type resin according to Example 3. The resulted cation exchange membrane had a transport number for sodium ion in 1.5 N sodium chloride solution of 75% at 25° C. and a value of specific conductivity in 0.5 N sodium chloride solution 35 x 10⁻³ mho cm.⁻¹ at 25° C.

*Example 6*

This example shows that hydrolysis proceeded more easily when the resin was swollen previously, 10 sheets of sheet form polymer, 0.7 mm. thick and 10 cm. x 10 cm. in area of Examples 1 and 2, were hydrolysed in mixed solution which is consisted of 80 parts of caustic soda, 100 parts of dioxane and 1000 parts of ethanol at a reflux temperature of said mixed solution for 50 hours. The transport number of sodium ion and specific conductivity of resulted membrane were 85% in 1.5 N sodium chloride solution at 25° C. and 27 x 10⁻³ mho cm.⁻¹ in 0.5 N sodium chloride solution at 25° C. respectively.

*Example 7*

1000 parts of freshly distilled ethylenesulfondimethylamide was polymerized partially into partial polymerizate by similar method to that of Example 1. 100 parts of divinylbenzene, 80 parts of ethylvinylbenzene. 400 parts of diethylphthalate and 1 part of lauroyl peroxide were added to said partial polymerizate and this mixture was polymerized for 24 hours at 60° C., for 24 hours at 80° C., and for 10 hours at 100° C. in a nitrogen atmosphere, then resulted polymerizate was hydrolyzed, and thus sulfonic acid type cation exchange membrane was obtained.

Example 8

The uniform mixture of 4 parts of distilled butyl ethylenesulfonate and 16 parts of distilled styrene was partially polymerized in a nitrogen atmosphere at a temperature of 100° C. for 12 hours. This partial polymerizate had a viscosity of about 850 poises and was found as a result of analysis to contain about 22% polymer. 116 parts of butyl ethylenesulfonate, 264 parts of ethylenesulfonate, 32 parts of divinylbenzene, 48 parts of ethylvinylbenzene, 140 parts of dimethylphthalate as a plasticizer and 0.16 part of benzoyl peroxide as a polymerizing catalyst were added to said solution and the mixture was uniformly mixed. The whole of this mixture was polymerized at 60° C. for 24 hours, at 60° C. for 24 hours, and at 100° C. for 48 hours. Thus a white, turbid and opaque polymer was obtained. This polymer could be worked into shape such as membrane or bar. On the contrary, when the same monomers were subjected to solution polymerization, cracks were caused during polymerization and no polymer of large dimensions could be obtained.

Example 9

This example shows a process of hydrolyzing with an alkaline hydrolyzing reagent the base polymer matrix having sulfonic acid ester group in the preceding Example 8. A sheet form polymer having a thickness of 0.7 mm. and an area of 10 cm. x 10 cm. was made by any of the processes mentioned in Example 8. Before hydrolysis, said polymer matrix had or had not the plasticizer removed with a solvent. These 10 sheets were put into a reaction vessel provided with a reflux condenser. 80 parts of caustic soda were dissolved in 1000 parts of ethyl alcohol and this solution was put into a reaction vessel. This solution and sheets were heated at the reflux temperature for 72 hours. After the reaction, the sheets were washed in water. The potential differences of two silver chloride electrodes inserted in two chambers, which are separated by these cation exchange membranes, and in each of which 1 normal and 2 normal aqueous solutions of sodium chloride were effluted, were measured and as the transport number of sodium ion through this membrane in 1.5 normal aqueous solution of sodium chloride, values computed according to Nernst's formula were tabulated below. The specific conductivity of these membranes was measured in 0.5 normal aqueous solution of sodium chloride and tabulated below.

| | Transport number (percent) of sodium ions in sodium chloride solution of 1.5-normal at 25° C. | Specific conductivity in sodium chloride solution of 0.5-normal at 25° C. (mho/cm. ×10³) |
|---|---|---|
| Cation exchange resin of Example 8 | 91 | 7 |

A methyl alcoholic solution of 8% caustic potash or caustic soda, an ethyl alcoholic solution of 8% caustic potash, or an aqueous solution of 30% caustic soda or caustic potash could be carried out instead of the alcoholic solution of 8% caustic soda.

Example 10

This example shows a process of hydrolyzing with an acidic hydrolyzing reagent. A base polymer matrix having sulfonic acid ester group made in Example 8. The polymer matrix made in any of Example 8 may or may not have the plasticizer removed by a solvent. 10 sheets of these base polymer having a thickness of 0.7 mm. and an area of 10 cm. x 10 cm. were put into a reaction vessel provided with a reflux condenser. Then 1000 parts of concentrated hydroiodic acid having a specific gravity of 1.7 were put into the reaction vessel. This solution and sheets were heated at the reflux temperature for 100 hours. After the reaction was completed, the sheets were then immersed in a caustic soda solution of 1-normal for 24 hours, were washed with water. The transport number and specific conductivity of each of these cation exchange film membranes were as shown in the following table:

| Base polymer matrix | Transport number (percent) of sodium ions in sodium chloride solution of 1.5-normal at 25° C. | Specific conductivity ($\Omega^{-1}$cm.$^{-1}$) × 10³ in sodium chloride solution of 0.5-normal at 25° C. |
|---|---|---|
| Cation exchange resin of Example 8 | 92 | 8 |

When the base polymer matrix having sulfonic acid ester group was soaked in 98% sulphuric acid at 75° C. for 24 hours, the ester could be hydrolyzed similarly as in this example. Phosphoric acid could be used instead of sulphuric acid.

Example 11

145.6 parts of freshly distilled styrene were polymerized partially at the temperature of 100° C. for 12 hours in the atmosphere of nitrogen. This partial polymerizate had a viscosity of about 900 poises and was found to contain about 25% of polymer by analysis. 254.4 parts of butyl ethylenesulfonate, 32 parts of divinylbenzene, 48 parts of ethylvinylbenzene, 160 parts of diethylphthalate as plasticizer and 0.4 part of benzoylperoxide as a catalyst were mixed uniformly. The whole mixture was polymerized at the temperature of 60° C. for 24 hours, at 80° C. 24 hours and at 100° C. 6 hours. Thus a turbid and opaque polymer was obtained which could be worked into the shapes such as sheet or rod. On the contrary, when the same composition of monomers was polymerized according to usual solution polymerization, many cracks resulted, and polymer of large dimensions was not obtained.

Example 12

145.6 parts of freshly distilled styrene was partially polymerized at 100° C. for 12 hours in the nitrogene atmosphere. This partial polymerizate had viscosity of 900 poises and was found to contain about 25% of polymer by analysis. To this, 254.4 parts of butyl ethylenesulfonate, 32 parts of divinylbenzene, 48 parts of ethylvinylbenzene, 160 parts of diethylphthalate as a plasticizer and 0.4 part of benzoylperoxide as a catalyst were added and mixed uniformly. After deaerating, this mixture was poured into hexahedron polymerization vessel having two facing walls i.e. 50 cm. long, 50 cm. wide and with clearance of 0.07 cm. After putting the lid, this vessel was held at 60° C. for 24 hours and 100° C. for 12 hours, thus the base polymer matrix of 50 cm. x 50 cm. in area and 0.07 cm. thick was obtained. This sheet was turbid and elastic and had no crack. When the same composition of monomers was polymerized at 50° C. for 24 hours, at 100° C. 12 hours according to usual polymerization, cracking and fracture resulted, and only small pieces of polymer having the dimensions of about 5 cm. x 5 cm. were obtained, which were transparent and quite different from the polymer according this invention.

Example 13

44 parts of newly distilled styrene was partially polymerized at 100° C. for 12 hours in the nitrogene atmosphere. This partial polymerizate had viscosity of about 900 poises and was found to contain about 25% of polymer by analysis. To this 160 parts of styrene, 196 parts of butyl ethylenesulfonate, 32 parts of divinylbenzene, 48 parts of ethylvinylbenzene, 160 parts of dimethylphthalate and 0.4 part of benzoylperoxide were added and mixed uniformly. The whole mixture was polymerized according to the same process as in Example 11. This block polymer can be worked into the shapes such as sheet, rod and pipe by planer or lathe.

Example 14

11 parts of commercial polystyrene was crushed and dissolved in 13 parts of freshly distilled styrene. This solution was used in place of partial polymerizate of styrene in Examples 11 to 13.

Example 15

This example shows hydrolysis by alkaline medium of base polymer containing sulfonic acid ester group obtained in Examples 11 to 14. Sheet formed base polymer matrix, 10 cm. x 10 cm. in area and 0.07 cm. thick, were prepared according to the processes in Examples 11 to 14. The plasticizer contained in polymer may or may not be extracted from the polymer. 10 sheets of these polymer were put into reaction vessel having reflux condenser. 1000 parts of 2 moral alcoholic solution of sodium hydroxide were poured in this reaction vessel. The whole was heated at its reflux temperature for 72 hours. After the hydrolysis these sheet formed cation exchange resin were washed in water. The potential differences of two silver chloride electrolodes inserted in two chambers, which are separated by these cation exchange membranes, and in each of which 1 normal and 2 normal aqueous solutions of sodium chloride were effluted, were measured and the transport number of sodium ion through this membrane in 1.5 normal aqueous solution of sodium chloride, values computed according to Nernst's formula, were tabulated below. The specific conductivity of these membranes was measured in 0.5 normal aqueous solution of sodium chloride and tabulated below.

|  | Transport number of sodium ion through the membrane in 1.5 normal aqueous solution of sodium chloride at 25° C. (Percent) | Specific conductivity of the membrane in 0.5 normal aqueous solution of sodium chloride at 25° C. ($\Omega^{-1} \times cm.^{-1}) \times 10^3$ |
|---|---|---|
| Ion exchange resin membrane from the base polymer in Example 11 | 85 | 11 |
| Ion exchange resin membrane from the base polymer in example 12 | 85 | 11 |
| Ion exchange resin membrane from the base polymer in Example 13 | 70 | 3 |
| Ion exchange resin membrane from the base polymer in Example 14 | 81 | 16 |

As already mentioned in Examples 11 to 14, when butyl ethylenesulfonate and divinylbenzene were copolymerized with or without styrene according to the usual processes, a polymer of large dimensions could not be obtained but only pieces of about 5 cm. length, 5 cm. width, 0.07 cm. thickness were obtained. When these small pieces were hydrolyzed according to the process above mentioned, they were fractured into fragments smaller than about 0.5 cm. and no hydrolyzed sheet of large dimensions was obtained. Polymers of any shape which are obtained according to the processes in Examples 11 and 14 could be hydrolyzed into sulfonic acid type ion exchange resin of any shape. These polymer could also be hydrolyzed by heating them in 8% aqueous solution of sodium hydroxide under reflux for 100 hours.

Example 16

This example shows hydrolysis by acidic hydrolysing agent of base polymer matrix containing sulfonic acid ester. The plasticizer contained in base polymers in Examples 11 to 14 may or may not be extracted from the polymers. 10 sheets of polymer of 10 cm. in length, of 10 cm. in width and of 0.07 cm. thickness were charged in the reaction vessel having a reflux condenser. In this vessel, hydroiodic acid of specific weight 1.7 was filled and the whole was heated at its reflux temperature for 100 hours. After the reaction, these sheets were soaked in 1 N aqueous solution of sodium hydroxide for one day, washed and stored in water. The transport numbers and specific conductivities of these cation exchange membranes were tabulated below:

|  | Transport number of sodium ion through the membrane in 1.5 normal aqueous solution of sodium chloride at 25° C. (Percent) | Specific conductivity of the membrane in 0.5 normal aqueous solution of sodium chloride at 25° C. ($\Omega^{-1} \times cm.^{-1}) \times 10^3$ |
|---|---|---|
| Ion exchange resin membrane from the base polymer in Example 11 | 90 | 10 |
| Ion exchange resin membrane from the base polymer in Example 12 | 90 | 10 |
| Ion exchange resin membrane from the base polymer in Example 13 | 76 | 1 |
| Ion exchange resin membrane from the base polymer in Example 14 | 86 | 14 |

These base polymer containing sulfonic acid ester radical could also be hydrolyzed by soaking than in 90% sulfuric acid at 75° C. for 24 hours similarly in this example.

Example 17

In place of butyl ethylenesulfonate, butyl α-styrenesulfonate could be used. This is shown in the following example. 280 parts of freshly distilled styrene was polymerized partially at 100° C. for 12 hours in the nitrogen atmosphere. This partial polymerizate had viscosity of about 900 poises and found to contain about 25% of polymer by analysis. To this, 120 parts of butyl styrenesulfonate, 32 parts of divinylbenzene, 48 parts of ethylvinylbenzene, 160 parts of dimethylphthalate and 0.4 part of benzoylperoxide were added and mixed uniformly. The whole mixture was polymerized at 60° C. for 24 hours and at 80° C. for 24 hours. As already mentioned in the preceding examples, sheet formed base polymer matrix of 50 cm. x 50 cm. in area and 0.07 cm. thick were obtained. These sheets were turbid and apaque, and had no crack. 10 sheets of this polymer were charged in a reaction vessel having a reflux condenser. To this vessel, ethanol saturated with 1000 parts of sodium hydroxide was poured. The whole contents was heated at its reflux temperature for 120 hours. After the reaction, these sheets were washed in water. The transport number of sodium ion of this membrane in 1.5 normal aqueous solution of sodium chloride at 25° C. was 92% and specific conductivity of this membrane in 0.5 N aqueous solution of sodium chloride at 25° C. was $15 \times 10^{-3}$ $\Omega^{-1}$x cm.$^{-1}$. In place of butyl styrenesulfonate, esters, acid chlorides, acid anhydrides and acid amides of styrenesulfonic acid, α-methylethylenesulfonic acid, α-chloroethylenesulfonic acid, α-bromoethylenesulfonic acid, α-phenylethylenesulfonic acid, α-tolylethylenesulfonic acid, α-butylethylenesulfonic acid, α-ethylphenylethylenesulfonic acid, α-cyclopentylethylenesulfonic acids, α-octylethylenesulfonic acid etc. could be used similarly. As mentioned above according to the polymerization processes in Examples 11 to 17, there does not result fracture or cracking during their preparation. Similar results with Examples 11 to 17 were obtained using vinyltoluene, α-methylstyrene, vinylchlorobenzene, vinylxylene, vinylchloride, vinylidenechloride, methylvinylether, methylvinylketone, vinylacetate etc. instead of styrene in Examples 11 to 17.

What we claim is:

1. A solid unfractured synthetic cation exchange resin composition having at least two dimensions each in excess of one cm. and comprising a three dimensionally crosslinked polymer matrix bonded to sulfonic cation exchange groups; said matrix being formed as a polymer-

13 ization product of a solution mixture of, (I) from 15% to 80% by weight of vinyl compound having the structure of $CH_2=CH.SO_2R$ wherein R is a member selected from the group consisting of a halogen, methoxy, ethoxy, butyloxy, propoxy, amyloxy, and dimethylamine, (II) from 0% to 40% by weight styrene, (III) from 0.5% to 20% by weight of copolymer of (I) and (II), (IV) from 3% to 10% by weight divinylbenzene, and (V) from 15% to 40% by weight dialkyl phthalate as a plasticizer, said cation exchange groups being bonded to said matrix after hydrolysis of said acid derivative groups.

2. A solid unfractured synthetic cation exchange resin composition having at least two dimensions each in excess of one cm. and comprising a three dimensionally crosslinked polymer matrix bonded to sulfonic cation exchange groups; said matrix being a polymerization product of a solution mixture of (I) from 15% to 80% by weight of vinyl compound having the structure of $$CH_2=CH-SO_2R$$

wherein R is a member selected from the group consisting of a halogen, methoxy, butyloxy, propoxy, amyloxy, amino, and dimethylamino, (II) from 0% to 40% by weight styrene, (III) from 0.5% to 20% by weight polymer of (I), (IV) from 3% to 10% by weight divinylbenzene, and (V) from 15% to 40% by weight dialkyl phthalate as a plasticizer, said cation exchange groups being bonded to said matrix after hydrolysis of said acid derivative groups.

3. The composition defined in claim 1, wherein the number of carbon atoms of alkyl of dialkyl phthalate is 1 to 8.

4. A solid unfractured synthetic cation exchange resin composition having at least two dimensions each in excess of one cm. and comprising a three dimensionally crosslinked polymer matrix bonded to sulfonic cation exchange groups; said matrix being a polymerization product of a solution mixture, of (I) from 15% to 80% by weight of vinyl compound having the structure of $$CH_2=CH-SO_2R$$

wherein R is a member selected from the group consisting of a halogen, methoxy, ethoxy, butyloxy, propoxy, amyloxy, amino, and dimethylamino, (II) from 0% to 40% by weight styrene, (III) from 0.5% to 20% by weight of polymer of (II), (IV) from 3% to 10% by weight divinyl benzene, and (V) from 15% to 40% by weight dialkyl phthalate as a plasticizer, said cation exchange groups being bonded to said matrix after hydrolysis of said acid derivative groups.

5. A solid unfractured synthetic cation exchange resin composition having at least two dimensions each in excess of one cm. and comprising a three dimensionally crosslinked polymer matrix bonded to sulfonic cation exchange groups; said matrix being a polymerization product of a solution mixture of, (I) from 15% to 80% by weight of a vinyl compound having the structure of $$CH_2=CH-C_6H_4-SO_2R$$

wherein R is a member selected from the group consisting of a halogen, methoxy, ethoxy, butyloxy, propoxy, amyloxy, amino, and dimethylamino, (II) from 0% to 40% by weight styrene, (III) from 0.5% to 20% by weight of copolymer of (I) and (II), (IV) from 3% to 10% by weight divinyl benzene, and (V) from 15% to 40% by weight dialkyl phthalate as a plasticizer, said cation exchange groups being bonded to said matrix after hydrolysis of said acid derivative groups.

6. A solid unfractured synthetic cation exchange composition having at least two dimensions each in excess of

14 one cm. and comprising a three dimensionally crosslinked polymer bonded to sulfonic cation exchange groups; said matrix being a polymerization product of a solution mixture of, (I) from 15% to 80% by weight of a vinyl compound having the structure of $CH_2=CH-C_6H_4-SO_2R$ wherein R is a member selected from the group consisting of a halogen, methoxy, ethoxy, butyloxy, propoxy, amyloxy, amino, and dimethylamino, (II) from 0% to 40% by weight styrene, (III) from 0.5% to 20% by weight of polymer of (I), (IV) from 3% to 10% by weight divinyl benzene, and (V) from 15% to 40% by weight dialkyl phthalate as a plasticizer, said cation exchange groups being bonded to said matrix after hydrolysis of said acid derivative groups.

7. The composition defined in claim 5 wherein the number of carbon atoms of alkyl radical of dialkyl phthalate is from 1 to 8.

8. A solid unfractured synthetic cation exchange resin composition having at least two dimensions each in excess of one cm. and comprising a three dimensionally crosslinked polymer matrix bonded to sulfonic cation exchange groups; said matrix being a polymerization product of a solution mixture of, (I) from 15% to 80% by weight of a vinyl compound having the structure of $CH_2=CH-C_6H_4-SO_2R$ wherein R is a member selected from the group consisting of a halogen, methoxy, ethoxy, butyloxy, propoxy, amyloxy, amino, and dimethylamino, (II) from 0% to 40% by weight styrene, (III) from 0.5% to 20% by weight of polymer of (II), (IV) from 3% to 10% by weight divinyl benzene, and (V) from 15% to 40% by weight dialkylphahalate as a plasticizer, said cation exchange groups being bonded to said matrix after hydrolysis of said acid derivative groups.

9. The process of preparing a solid unfractured synthetic cation exchange resin having at least two dimensions each in excess of one cm. comprising polymerizing into block form a solution mixture of, (I) from 15% to 80% by weight of vinyl compound having the structure of $CH_2=CH-SO_2R$ wherein R is a member selected from the group consisting of a halogen, methoxy, ethoxy, butyloxy, propoxy, amyloxy, amino, and dimethylamino, (II) from 0% to 40% by weight styrene, (III) from 0.5% to 20% by weight of copolymer of (I) and (II), (IV) from 3% to 10% by weight divinylbenzene, and (V) from 15% to 40% by weight dialkyl phthalate as a plasticizer; slicing the block form matrix into sheet form matrix and hydrolyzing the sheet form matrix.

10. The process for preparing a solid unfractured synthetic cation exchange resin having at least two dimensions each in excess of one cm. comprising; polymerizing in block form a solution mixture of, (I) from 15% to 80% by weight of a vinyl compound having the structure of $CH_2=CH-C_6H_4-SO_2R$ wherein R is a member selected from the group consisting of a halogen, methoxy, ethoxy, butyloxy, propoxy, amyloxy, amino, and dimethyl amino, (II) from 0% to 40% by weight styrene, (III) from 0.5% to 20% by weight of copolymer of (I) and (II), (IV) from 3% to 10% by weight divinylbenzene, and (V) from 15% to 40% by weight dialkyl phthalate as a plasticizer; slicing the block form matrix into sheet form matrix and hydrolyzing the sheet form matrix.

References Cited in the file of this patent

UNITED STATES PATENTS

| | | |
|---|---|---|
| 2,348,705 | Alderman | May 16, 1944 |
| 2,500,149 | Boyer | Mar. 14, 1950 |
| 2,527,300 | Dudley | Oct. 24, 1950 |
| 2,697,080 | D'Alelio | Dec. 14, 1954 |
| 2,731,411 | Clarke | Jan. 17, 1956 |
| 2,734,044 | Bezman | Feb. 7, 1956 |